Nov. 11, 1952
C. W. STEWART
2,617,668
SEAL CONSTRUCTION
Filed Oct. 11, 1948
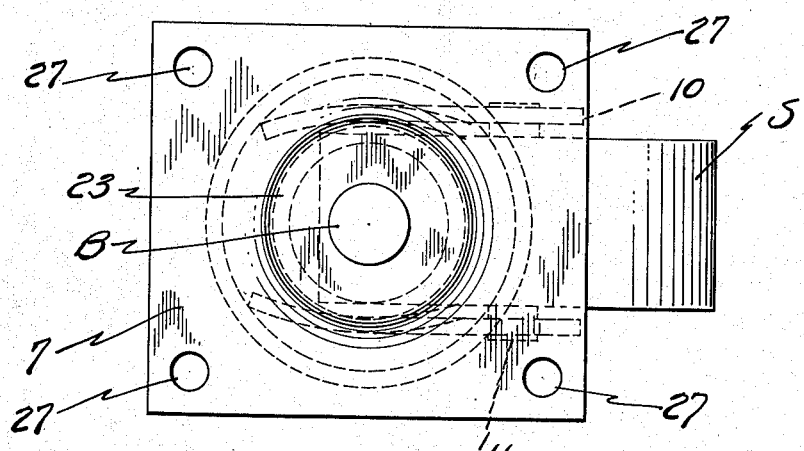
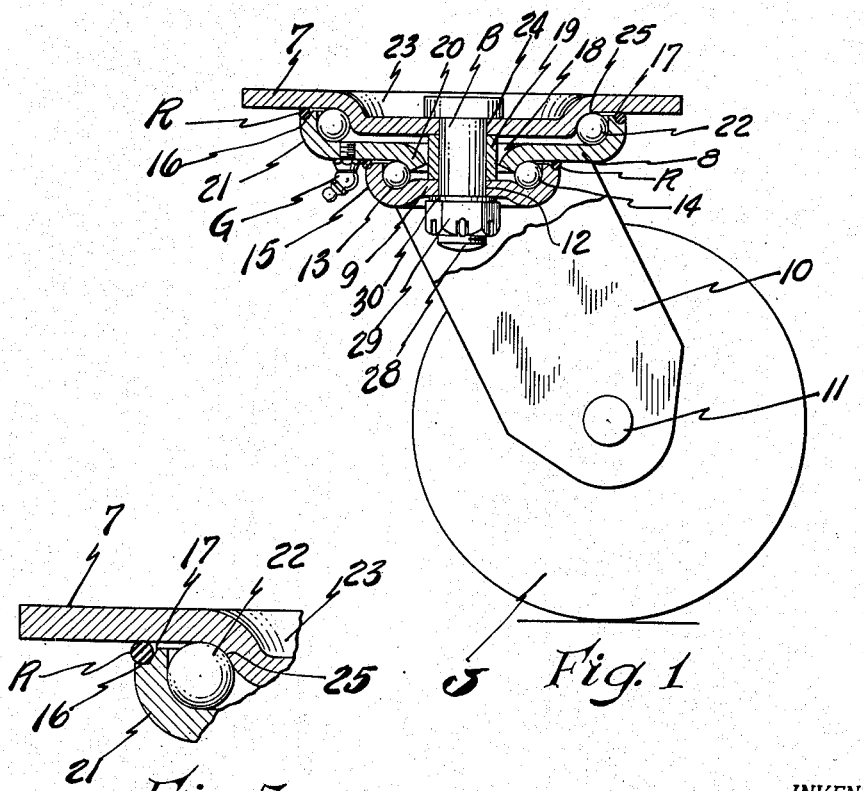
INVENTOR.
Colin W. Stewart
BY
Frank C. Scariman.
ATTORNEY Patented Nov. 11, 1952

2,617,668

UNITED STATES PATENT OFFICE 2,617,668

SEAL CONSTRUCTION

Colin W. Stewart, Saginaw, Mich., assignor to Saginaw Products Corporation, Saginaw, Mich.

Application October 11, 1948, Serial No. 53,850

2 Claims. (Cl. 286—5)

This invention relates to seals used to form a leak-proof joint and prevent escape of lubricant from ball race bearings and other mechanical equipment which requires lubrication from time to time.

One of the prime objects of the invention is to design a very simple, practical and economical, resilient sealing ring for application to the tapered surface of a caster or other device, and which automatically adjusts itself to any looseness in the construction due to normal manufacturing tolerances and wear.

Another object is to provide a sealing ring which is both heat and oil resistant, and which is extremely easy to apply and/or remove.

A further object is to provide a resilient sealing ring applicable to a tapered surface, so that it normally slides upwardly on said surface, requiring no mechanical means or internal pressure to maintain it in sealing position, and which can be readily applied to casters and the like, without disassembling the caster unit proper.

Other objects of my invention will appear as the description progresses.

To the accomplishment of the foregoing and related ends, said invention then consists of the means hereinafter fully described and particularly pointed out in the claims, the annexed drawing and following description setting forth, in detail, certain means and one mode of carrying out the invention, such disclosed means and mode illustrating, however, but one of the various ways in which the principle of the invention may be used.

In the drawing:

Fig. 1 is a part-sectional, side-elevational view showing the swivel caster with my sealing ring in position thereon.

Fig. 2 is a top, plan view thereof.

Fig. 3 is an enlarged, fragmentary, side-elevational view showing the ball race, tapered member and sealing ring.

Referring now more specifically to the drawing in which I have shown, for the purpose of illustration, a swivel caster unit with my sealing ring incorporated therewith, said caster including a top plate 7 and spaced-apart retaining disks 8 and 9 respectively.

Spaced-apart forks 10 are welded or otherwise secured to the disk 9, and a wheel member S is mounted between said forks and is journaled on a pin 11 in the conventional manner.

The retaining disk 9 is formed as clearly shown in Fig. 1 of the drawing, having a centrally disposed opening 12 therein to accommodate the bolt B, and a ball groove 13 is provided in said plate to accommodate anti-friction balls 14, the outer rim of the disk being upwardly turned as at 15, with the outer edge turned to form a shoulder 16, thence being upwardly and inwardly tapered as at 17 to form an upwardly tapered surface, and for a purpose to be presently described.

The retaining disk 8 is superimposed on the balls 14 and is formed with a centrally disposed opening 18 to accommodate the bolt B, together with the cylindrical spacer member 19 provided thereon, the marginal edge of the opening being turned as at 20 to form the upper section of the ball race.

The outer rim of the disk 8 is turned upwardly as at 21, and the marginal edge is shouldered and tapered in exactly the same manner as is the disk 9, and as clearly shown in Fig. 3 of the drawing, a plurality of anti-friction balls 22 being provided as shown, and a grease fitting G is mounted in the lower face of the disk for lubricating purposes.

The upper plate 7 is dished as at 23, and is formed with a centrally disposed opening 24 to accommodate the bolt B, the annular turned portion 25 of the plate 7, together with the turned rim 21 of the disk 8 forming a ball race for the anti-friction balls 22, and spaced-apart openings 27 are provided in the top plate so that it may be readily secured to a truck or other vehicle (not shown).

The lower end of the bolt B is threaded as at 28, and a nut 29 is threaded thereon, a washer 30 being interposed between said nut and the disk 9 for securing the parts in assembled relation.

The resilient sealing rings R are mounted on the shouldered sections 16 of the disks 8 and 9, and bear against the tapered walls 17, and due to their resiliency, ride upwardy on said tapered surfaces, and bear against the bottom of the face of the members 7 and 8 respectively, forming a leak-proof joint and seal thereat, no internal pressure or other mechanical means being necessary to force the ring up the taper.

The sealing ring can be made of any desired elastic material, but I prefer to form it of molded rubber, and the ball paths or grooves are, of course, carburized and hardened to give added wear and life.

From the foregoing description, it will be obvious that I have perfected a very simple, practical, and inexpensive sealing ring for casters and devices of a similar nature.

What I claim is:

1. The combination in a caster structure having a pair of vertically spaced, super-imposed plate members, rotatable with relation to each other, the lower plate being formed with a continuous upwardly turned rim, a groove provided in the upper and outer peripheral edge of the rim, said groove being open at the side and top, with the inner wall inwardly and upwardly inclined, and a resilient sealing ring mounted in said groove and bearing against said upwardly inclined inner wall and the lower face of the upper plate respectively.

2. In a sealing means of the class described, comprising vertically disposed, super-imposed plates, rotatable with relation to each other, the lower plate being formed with a continuous upwardly turned rim, the outer peripheral edge of said rim being shouldered and turned to form a groove for an oil seal, said groove being open at the side and top of the rim with its inner wall turned to form an inwardly and upwardly inclined surface, and a resilient molded rubber sealing ring mounted in said groove and bearing against said inclined surface and against the lower face of the upper plate respectively to form an oil-tight seal thereat.

COLIN W. STEWART.

REFERENCES CITED

The following references are of record in the file of this patent:

UNITED STATES PATENTS

| Number | Name | Date |
|---|---|---|
| 667,991 | Norwood | Feb. 12, 1901 |
| 1,238,731 | Anderson | Sept. 4, 1917 |
| 2,092,894 | Spracklen | Sept. 14, 1937 |
| 2,189,838 | Shafer | Feb. 13, 1940 |
| 2,443,312 | Geiger et al. | June 15, 1948 |

FOREIGN PATENTS

| Number | Country | Date |
|---|---|---|
| 47,842 | Netherlands | of 1940 |